(12) United States Patent
Satish et al.

(10) Patent No.: US 8,443,354 B1
(45) Date of Patent: May 14, 2013

(54) DETECTING NEW OR MODIFIED PORTIONS OF CODE

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1584 days.

(21) Appl. No.: 11/393,444

(22) Filed: Mar. 29, 2006

(51) Int. Cl.
*G06F 9/44* (2006.01)
*G06F 9/45* (2006.01)
*G06F 7/04* (2006.01)
*G06F 17/30* (2006.01)
*H04N 7/16* (2011.01)

(52) U.S. Cl.
USPC ........... 717/156; 717/104; 717/124; 717/126; 717/154; 717/155; 717/170; 726/26; 726/27

(58) Field of Classification Search .................. None
See application file for complete search history.

(56) References Cited

U.S. PATENT DOCUMENTS

| | | | | |
|---|---|---|---|---|
| 5,479,654 A | * | 12/1995 | Squibb | 707/201 |
| 5,944,821 A | * | 8/1999 | Angelo | 726/22 |
| 6,128,774 A | * | 10/2000 | Necula et al. | 717/146 |
| 6,298,445 B1 | * | 10/2001 | Shostack et al. | 726/25 |
| 6,308,270 B1 | * | 10/2001 | Guthery | 726/9 |
| 6,321,334 B1 | * | 11/2001 | Jerger et al. | 726/1 |
| 6,345,361 B1 | * | 2/2002 | Jerger et al. | 726/3 |
| 6,473,800 B1 | * | 10/2002 | Jerger et al. | 709/226 |
| 6,829,710 B1 | * | 12/2004 | Venkatesan et al. | 713/176 |
| 6,961,854 B2 | * | 11/2005 | Serret-Avila et al. | 713/176 |
| 7,149,900 B2 | * | 12/2006 | Rothrock | 713/189 |
| 2002/0099952 A1 | * | 7/2002 | Lambert et al. | 713/200 |
| 2003/0023856 A1 | * | 1/2003 | Horne et al. | 713/187 |
| 2003/0188174 A1 | * | 10/2003 | Zisowski | 713/189 |
| 2003/0200464 A1 | * | 10/2003 | Kidron | 713/201 |
| 2004/0003266 A1 | * | 1/2004 | Moshir et al. | 713/191 |

OTHER PUBLICATIONS

"Gold Parser, A Free Multi-Platform Parser Generator", [online] devincook.com [retrieved Oct. 7, 2003] Retrieved from the Internet: , <URL: http://www.devincook.com/goldparser/index.htm>.
"RFC 2821—Simple Mail Transport Protocol", Klensin J., editor, Apr. 2001, [online] Faqs.org [retrieved Oct. 13, 2003] Retrieved from the Internet: <URL: http://www.faqs.org/rfcs/rfc2821.html>.
Pop-up Stopper Professional [Online]Apr. 22, 2005, [Retrieved from the Internet on Apr. 22, 2005] Retrieved from the Internet: <URL: http://www.panicware.com/index.html>, Seattle, WA.
AdsCleaner v 4.3 for Windows NT/2000/XP, [Online] Apr. 22, 2005 [Retrieved from the Internet on Apr. 22, 2005] Retrieved from the Internet: <URL: http://adscleaner.com>.
AntiTracer: Unwanted Pop-ups and other Advertisements, [Online] Apr. 22, 2005, [Retrieved from the Internet on Apr. 22, 2005] Retrieved from the Internet: <URL: http://www.antitracer.com/popup_killer.html>, Dublin, IE.

(Continued)

*Primary Examiner* — Emerson Puente
*Assistant Examiner* — Jonathan R Labud
(74) *Attorney, Agent, or Firm* — Wilmer Cutler Pickering Hale and Dorr LLP

(57) ABSTRACT

Detecting new or modified portions of executable code is disclosed. An indication is received that a prior version of an executable file has been replaced by a new version. A security response is provided if a process associated with the executable file attempts to perform a restricted action and a new or changed portion of code comprising the new version has executed. If no new or changed portion of code has executed, the restricted action is allowed to an extent determined previously for the prior version of the executable file.

20 Claims, 7 Drawing Sheets

OTHER PUBLICATIONS

Sabin, Todd, "Comparing binaries with graph isomorphisms", downloaded from http://bindview,com/Services/Razor/Papers/2004/comparing_binaries.cfm, Jan. 17, 2006, Cupertino, CA.

Flake, Halvar, "Automated Reverse Engineering" Black Hat Windows 2004, downloaded from http://blackhat.com/html/bh-media-archives/bh-archives-2004.html, Jan. 17, 2006, Seattle, WA.

* cited by examiner

DETECTING NEW OR MODIFIED PORTIONS OF CODE

BACKGROUND OF THE INVENTION

Typically, a network security system treats a new version of a previously characterized and/or processed executable file (.exe) as a new or unknown entity. One reason is that a hash or other computation performed on the file commonly is used to detect changes in an executable file, since if malicious code were added to an executable the new code would be detected. Of course, it is also possible, and in some contexts considerably more likely, that a software patch (e.g., security or other update) or a new version has been installed (e.g., downloaded), and that the patched (or new) version does not represent any greater or lesser threat than the original. Often, a patch or new version only slightly modifies the overall structure and operation of the executable; this is especially true of large software applications such as word processing, spreadsheet, operating system, instant messaging, and other programs. The major functionality of such programs typically remains in place, and patches and new versions often represent only minor changes and/or additions to the pre-existing functionality and program structure.

However, in an all-or-nothing approach to security any detected change results in a patched or new version of a previously trusted (or not trusted) executable triggering the same response as entirely new or unknown code. For example, an outbound firewall that previously prompted a user for and received user input indicating whether an original version of an executable should be allowed to send an outbound communication in a typical case would have to prompt the user anew upon execution of such an operation by a patched or new version of the same executable, even if the portion of the executable that is being executing and is attempting to send the outbound communication is the same as the corresponding portion of the original executable (e.g., that portion of code was not affected by the patch). Depending on the circumstances, including user preferences and other user requirements, the number of executables installed and run on the protected host and how often they undergo legitimate change, etc., it may be highly undesirable to interrupt operations to prompt a user to indicate the extent to which an executable file should be trusted (e.g., permitted) to perform certain actions.

Therefore, there is a need for a way to ensure that unchanged portions of an executable file that have already been characterized for security purposes continue to be afforded the same level of trust subsequent to installation of a patch or new version that does not change such portions, and to ensure that new or changed portions are properly characterized.

BRIEF DESCRIPTION OF THE DRAWINGS

Various embodiments of the invention are disclosed in the following detailed description and the accompanying drawings.

DETAILED DESCRIPTION

Figure 1A:
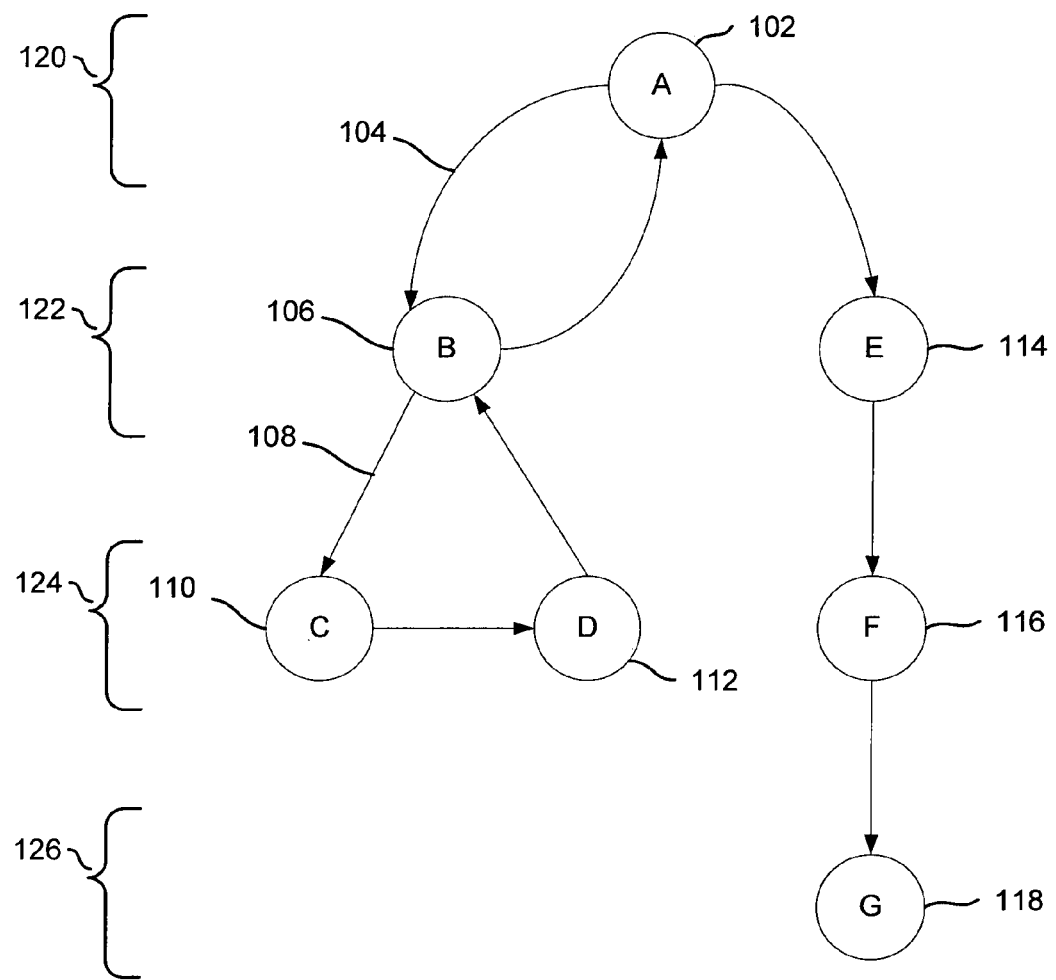
FIG. 1A is a block diagram illustrating an example of a functional flow diagram.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting and selectively providing computer security behaviors in response to execution of new or changed portions of previously-characterized executable code, e.g., an .exe file, are disclosed. An indication is received that a previously-characterized executable file has changed. In some embodiments, the indication comprises an indication that a hash or other value computed based at least in part on binary code comprising the executable does not match a corresponding value computed previously for the executable. Changed portions of the executable are identified. In some embodiments, known techniques are used to generate a functional flow graph of the executable file subsequent to the change being detected and the functional flow graph is compared, e.g., using known graph isomorphism techniques, to a corresponding flow graph generated prior to the change. New or changed portions of the functional flow graph are identified, and for each of at least a subset of the new or changed nodes a function is configured to set a flag or other global value or indicator upon execution of the new or changed branch. Attempts by the executable to perform certain (e.g., configured and/or user configurable) actions subsequent to the flag or other indicator being set result in a security response, e.g., prompting a user to indicate whether the action should be allowed. In some embodiments an indication is provided to the user as to how significantly the binary code has been changed, a score or other indication of a perceived level of threat posed by the new or changed branch, etc. In some embodiments, the security response is the same as would be provide if an entirely new or previously unknown and/or uncharacterized executable had attempted, requested, or performed the same action.

FIG. 1A is a block diagram illustrating an example of a functional flow diagram. In the example shown, from an entry point at node A (102) the executable may execute along one of two paths. A call (104) may be made to a node B (106), which in the example shown may result in a jump (108) to a node C (110), with further jumps to a node D (112) and then back to node B (106) prior to a response (to the call 104) being provided back to node A (102). The second execution path (or branch) begins a node A (102) and includes successive jumps to node E (114), node F (116) and node G (118). The example shown in FIG. 1A is highly simplified; even the most basic executable likely would have a much more complicated graph and/or more, different, and/or more complicated interrelationships between nodes. Techniques for disassembling binary code and generating a functional flow graphs such as the one shown in FIG. 1A are well known and commercially available and/or readily developed tools may be used to automate such techniques. Nodes such as those shown in FIG. 1A typically comprise blocks of binary instructions, typically ending in an instruction that transfers control at least for a time to another block of code, e.g., a call or jump (e.g., jn, jnz). In the example shown, the entry node A (102) is shown to occupy in an entry (e.g., zero depth) level 120. Nodes B (106) and E (114) are in a first depth level 122; nodes C (110), D (112), and F (116) are at a second depth level 124; and node G (116) is at a third depth level 126.

Figure 1B:
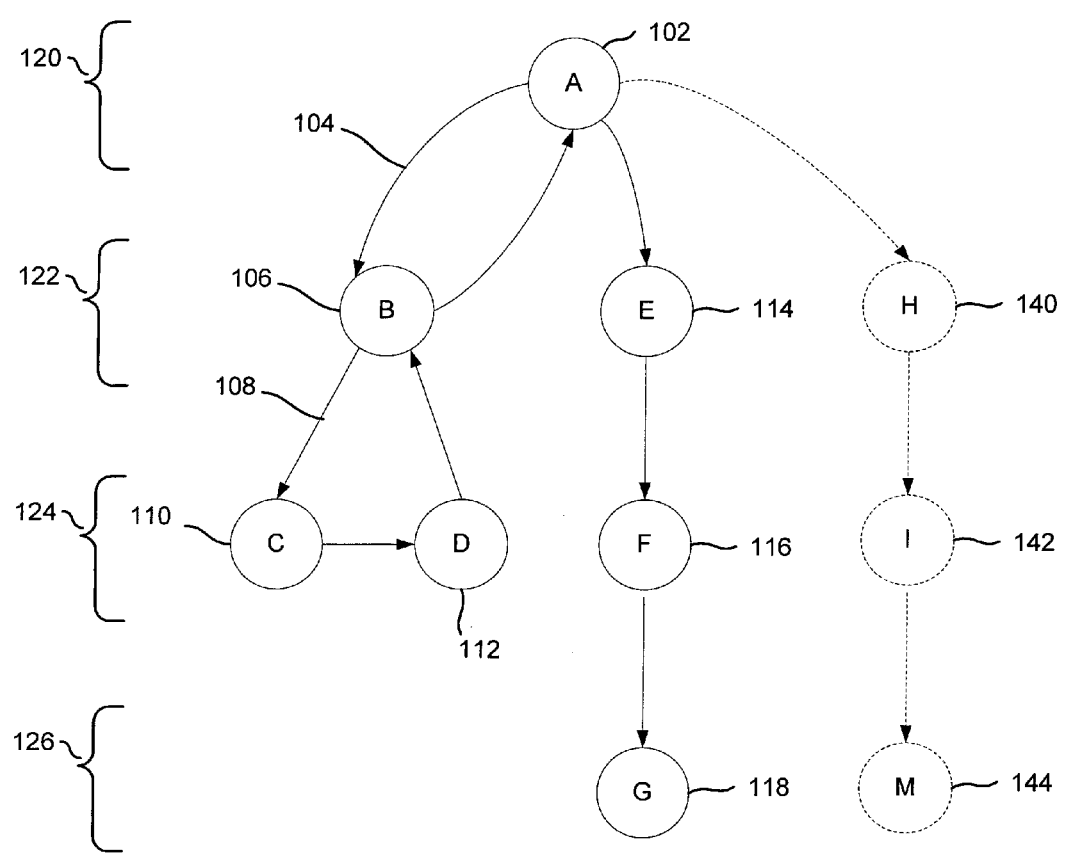
FIG. 1B is a block diagram illustrating a functional flow diagram of a first example of a modified (e.g., patched or new) version of the executable file the functional flow diagram of which is shown in FIG. 1A.

FIG. 1B is a block diagram illustrating a functional flow diagram of a first example of a modified (e.g., patched or new) version of the executable file the functional flow diagram of which is shown in FIG. 1A. In this example, the modified version is identical to the original version shown in FIG. 1A except that it includes a newly added third execution path (branch) from node A (102) to nodes H (140), I (142), and M (144). Node M in this example includes malicious code that a hacker or other unauthorized person or code has caused to be added to the executable.

Figure 1C:
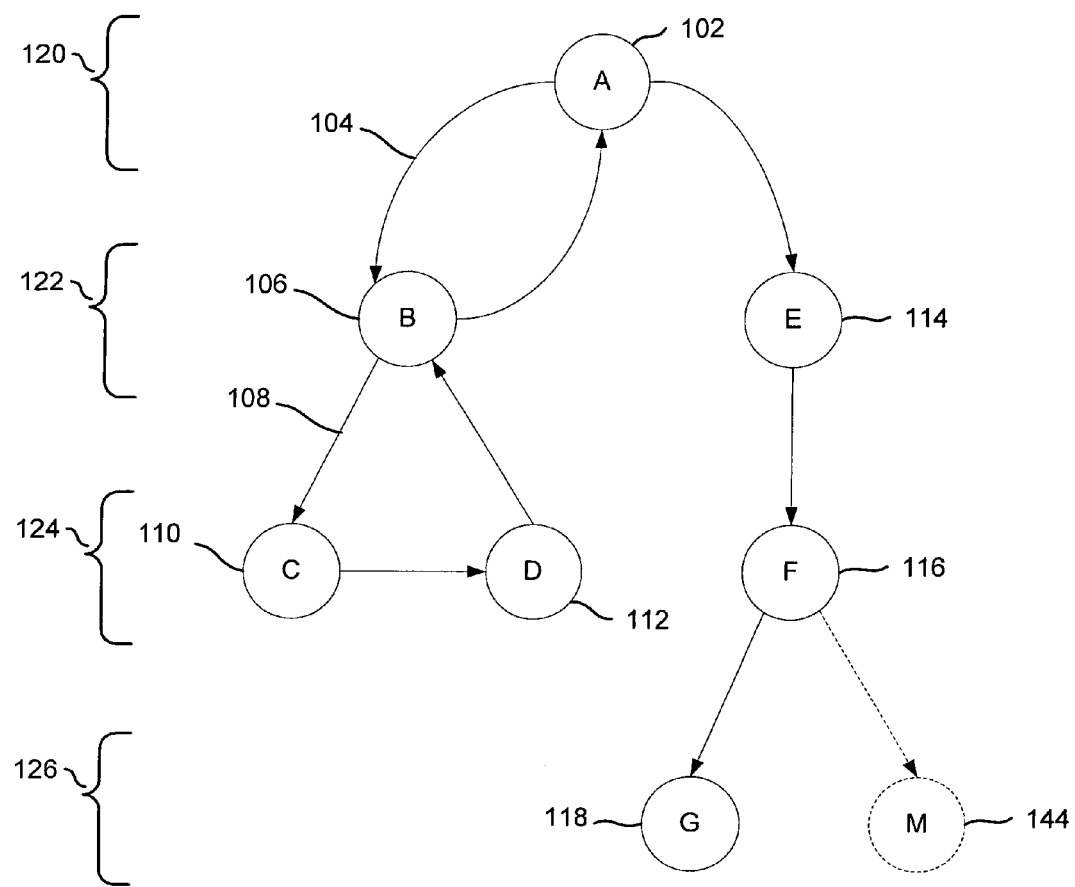
FIG. 1C is a block diagram illustrating a functional flow diagram of a second example of a modified (e.g., patched or new) version of the executable file the functional flow diagram of which is shown in FIG. 1A.

FIG. 1C is a block diagram illustrating a functional flow diagram of a second example of a modified (e.g., patched or new) version of the executable file the functional flow diagram of which is shown in FIG. 1A. In this example, the modified version is identical to the original version shown in FIG. 1A except that it includes a newly added sub-path from node F (116) to node M (144), which as in the example shown in FIG. 1B includes malicious code that a hacker or other unauthorized person or code has caused to be added to the executable.

In some embodiments, a modification such as shown in FIG. 1B or FIG. 1C would be detected by computing a hash of the binary code and comparing the result to a stored result computed previously, e.g., based on the binary code corresponding to the graph in FIG. 1A. In some embodiments, in the event such a change in the binary code is detected graph isomorphism techniques are used to determine, as a threshold matter, whether the code has changed so substantially that the new (modified) version should be treated as untrustworthy and/or not yet characterized (e.g., as if new) in its entirety. In some embodiments, the degree of similarity (and/or dissimilarity) between the original and new graphs is determined (e.g., quantified) and the degree and/or nature of the difference(s) is/are used to determine whether the changes are such that the entire binary should be treated as not trustworthy and/or not yet characterized. In various embodiments, such an approach would result in the first example modified version shown in FIG. 1B being treated as untrustworthy and/or uncharacterized due to the magnitude and/or significance of the new code relative to the original (e.g., 50% increase in first depth level nodes/branches from two to three; addition of one or more new nodes at the first depth level; addition of a branch apparently unrelated to pre-existing branches; addition of a branch spanning greater than a threshold number of depth levels; etc.). In some embodiments, by contrast, the second example modified version shown in FIG. 1C may not result in the entire binary being treated as untrustworthy and/or uncharacterized since only one node (node M (144)) was tagged on to an existing branch (A→E→F) at the third depth level 126.

Either in an embodiment in which an initial test to determine whether a new version should be treated in its entirety as untrustworthy and/or uncharacterized is not performed, or in an embodiment in which such a check is performed but found in a particular instance not to require that the new version be treated as untrustworthy and/or uncharacterized, there is a need for a way to ensure that new or modified portions of the binary, if/when executed, receive the proper security treatment. In some embodiments, such new portions are not assumed to have the same level of trust and/or other security characteristics and/or requirements as unmodified portions of code comprising the new version. Instead, portions that have not changed receive the same treatment as they did prior to the new and/or modified portions being added, and execution of new and/or modified portions results in different security treatment. Examples of such treatment include blocking execution along uncharacterized paths; displaying a dialog box, sending an alert, making a log entry, and/or generating and/or sending some other notification; blocking certain actions requested and/or attempted by the executable, such as outbound network communications (e.g., at a firewall), certain system calls, etc.; and prompting a user for input to be used to characterize the new portion (e.g., as trusted or not trusted, permitted to perform the requested/attempted action or not, etc.).

In some embodiments, at least new or modified portions of the executable are modified to provide an indication when such new or modified portions execute. For example, in some embodiments, a call to a newly added node is intercepted and redirected to a replacement function that sets a flag or other global data value or indicator (e.g., in process heap) to a value and/or state that indicates a new or modified portion of the executable has been executed. In some embodiments, a trampoline function or other mechanism is used to return control and permit execution of the new or modified portion of code once the flag or other indicator has been set. Then, if the executable requests or attempts to perform an action the security system and/or process is configured (e.g., security vendor set and/or user configurable) to provide security with respect to (e.g., outbound network communication to an external network, e.g., through a firewall), the flag or other indicator is checked and is determined to have a value or state that indicates new or modified code is executing, which results in an appropriate (e.g., configured and/or configurable) security response, such as prompting a user to indicate whether the executable should be permitted to perform the requested action.

Figure 1D:
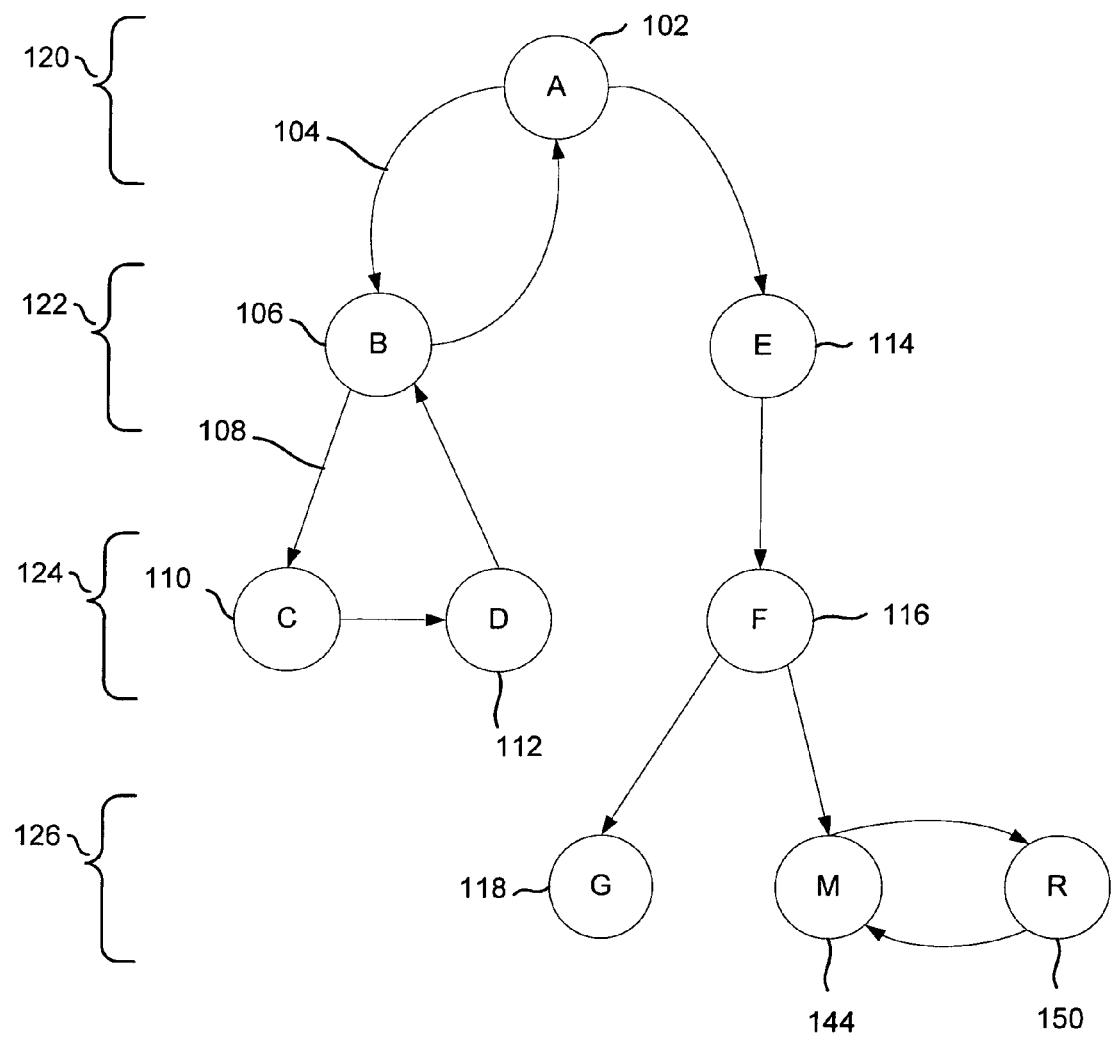
FIG. 1D is a block diagram illustrating a functional flow diagram of the second example modified version shown in FIG. 1C with a notification function added.

FIG. 1D is a block diagram illustrating a functional flow diagram of the second example modified version shown in FIG. 1C with a notification function added. In the example shown, a transition from node F (116) to new node M (144) causes a notification function at node R (150) to be invoked and executed, e.g., to set a flag or other indicator that new or modified code is executing, in this example the code associated with newly added node M (144). In some embodiments, a call, jump, or other change-of-control instruction associated with a transition from node F (116) to node M (144) in the modified version shown in FIG. 1C is intercepted, mirrored, and/or redirected to a replacement function at node R (150). In some embodiments, the replacement function is configured and added to the executable by a security system, application, process, and/or user/administrator. In some embodiments, the replacement (or other notification) function at node R (150) is configured to set a flag or other global data value or indicator, as described above, to indicate a new or changed portion of code is executing. Upon a subsequent request or attempt by the executable to perform a configured action, a security process not shown in FIG. 1D checks the value and/or state of the flag or other indicator and takes or initiates an appropriate security response if the flag or other indicator has been set to a value and/or state that indicates new and/or changed binary code comprising the executable has been and/or is executing. In some embodiments, the replacement function at node R (150) includes and/or uses a trampoline function or other mechanism to return control back to the new/changed node, node M (144) in this example, once the value and/or state of the flag or other indicator has been set to a value and/or state indicating a new/changed portion of code has been and/or is executing.

Figure 2:
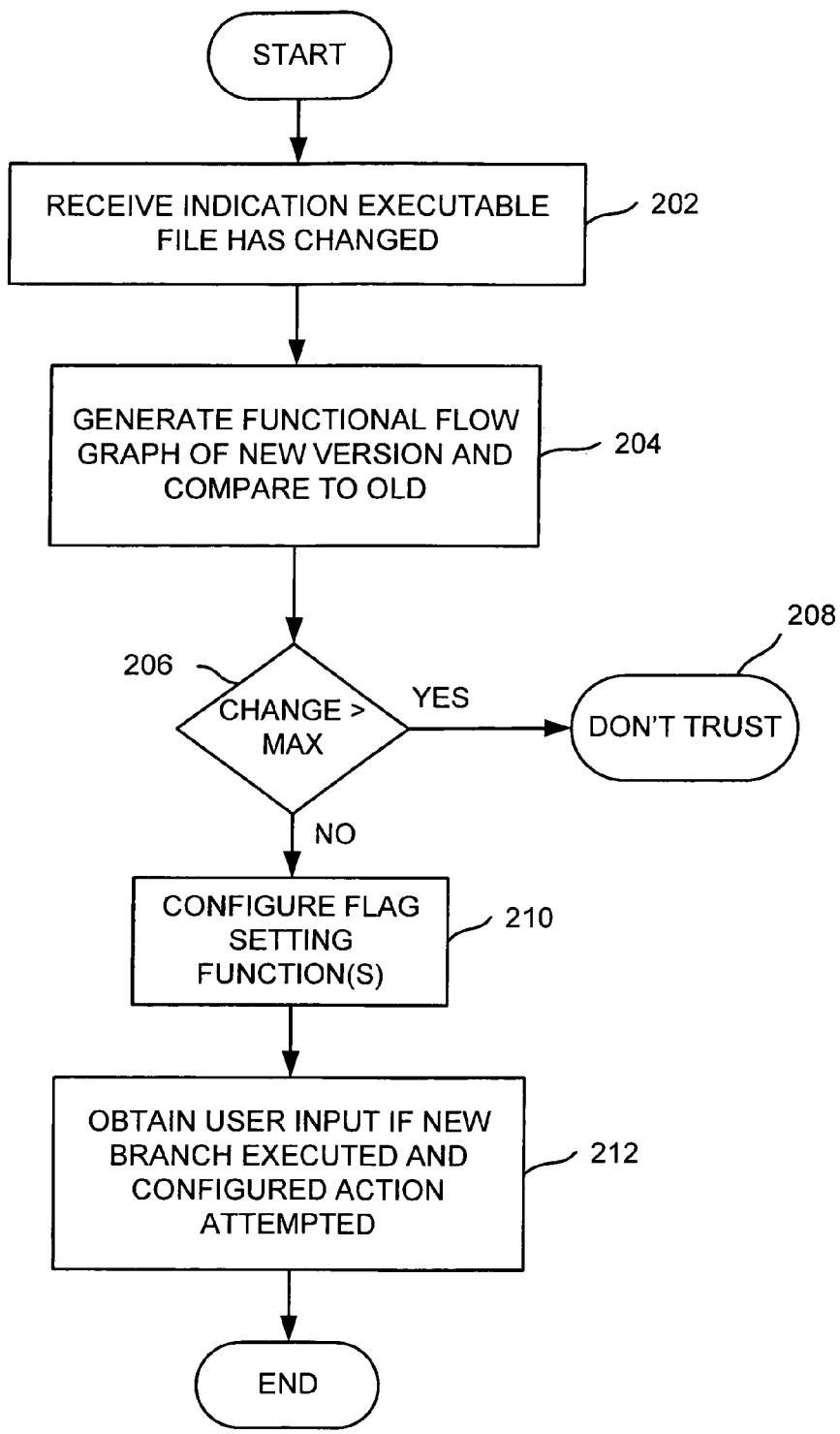
FIG. 2 is a flow chart illustrating an embodiment of a process for detecting and responding to new and/or change portions of an executable.

FIG. 2 is a flow chart illustrating an embodiment of a process for detecting and responding to new and/or change portions of an executable. At 202, an indication is received that an executable file has changed, e.g., a file having the same file name (or portion thereof) and/or stored in the same location as a previously-characterized executable includes binary code that is not identical to that of the originally characterized version, determined e.g., by computing a hash of binary code comprising the current version with a corresponding hash computed based on the previously-characterized version. At 204, the binary code is disassembled and a functional flow graph of the new version is generated and compared to a corresponding functional flow graph of the prior, previously-characterized version. In this example, if the difference between the functional flow graphs exceeds a prescribed threshold, as determined by quantitative, qualitative, and/or other at least partially automated criteria, e.g., as describe above (206), at 208 the new version is treated as untrustworthy and/or not yet characterized in its entirety, i.e., the same as a newly installed executable that has never been run before. If the difference between the old and new versions do not exceed the threshold (206), at 210 a flag (or other indicator) setting function is configured and/or hooked into at least a subset of the new/changed nodes in the new version. At 212, if a new/changed portion of code has been and/or is executing and the executable attempts and/or requests a configured action (e.g., sending an outbound network communication) in this example user input is obtained to determine whether the executable will be permitted to or blocked from performing the action. In various embodiments, 212 includes other or different responses, such as blocking the action, generating an alert, making a log entry, etc. In some embodiments, 212 includes providing to a user an indication of the extent to which the executable has been changed and/or a degree of risk determined and/or projected or estimated to be posed by the change. In some embodiments, 206 and 208 are omitted.

Figure 3:
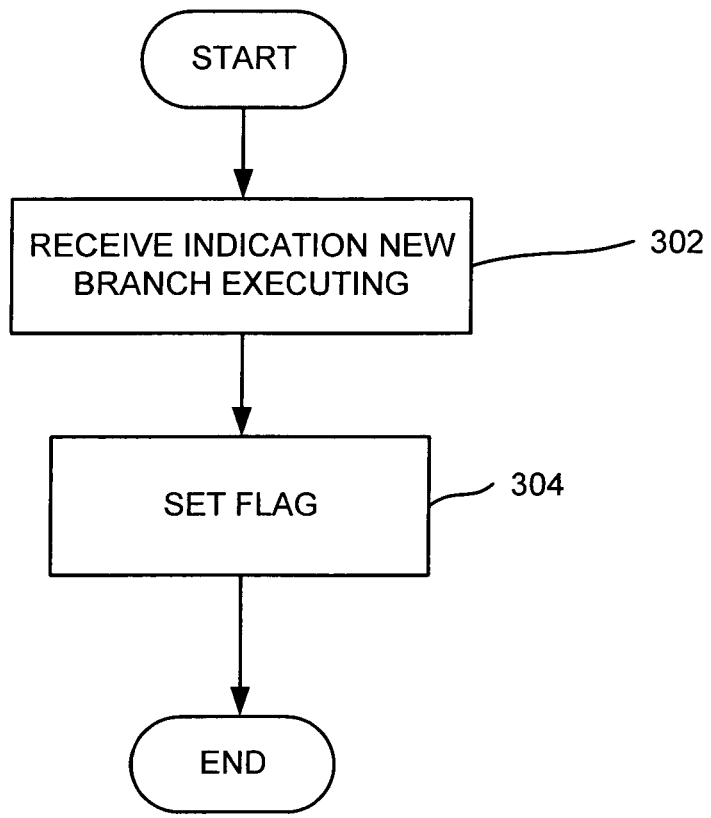
FIG. 3 is a flow chart illustrating an embodiment of a process for setting a flag or other global indicator to a value and/or state indicating that a new or changed portion of an executable has been and/or is executing.

FIG. 3 is a flow chart illustrating an embodiment of a process for setting a flag or other global indicator to a value and/or state indicating that a new or changed portion of an executable has been and/or is executing. In some embodiments, the process of FIG. 3 is implemented at list in part on/by a notification function such as described above in connection with node R (150) of FIG. 1D. At 302, an indication is received that a new/changed portion of code is executing (or, in various embodiments, has been executing and/or is about to execute). In some embodiments, the indication received at 302 is provided at least in part by configuring a hook or other mechanism to intercept, redirect, and/or mirror a call, jump, or other change of control instruction associated with invoking the new/changed portion of code. At 304, a flag (or other indicator value) is set to a data value and/or state indicating that a new/changed portion of code has been and/or is executing and/or is about to execute. In some embodiments, the flag set at 304 comprises a binary flag stored in a reserved space in memory, e.g., in process heap. In some embodiments, the flag set at 302 uniquely identifies, e.g., by virtue of its location, the particular portion of new/changed code that has been and/or is executing and/or is about to execute.

Figure 4:
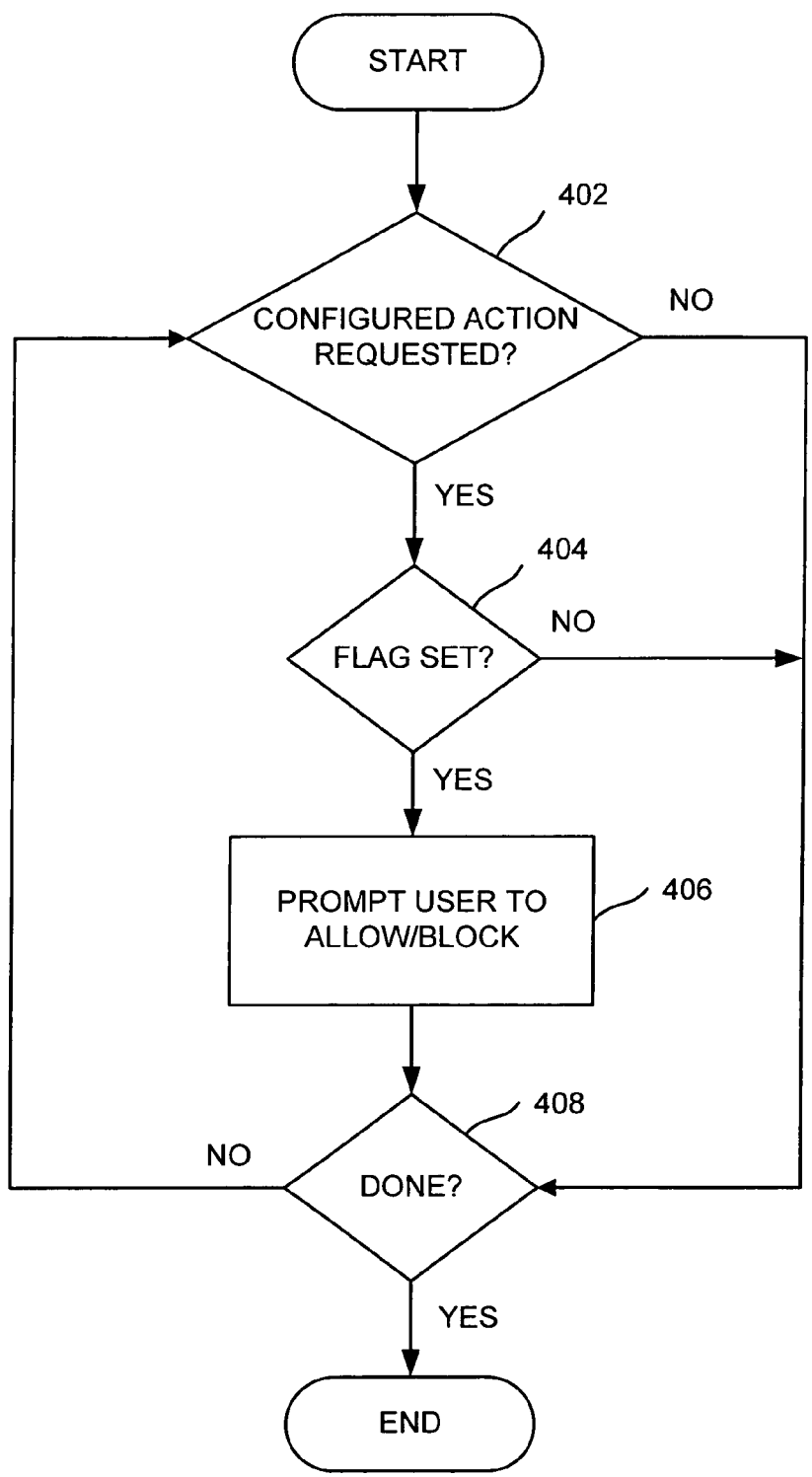
FIG. 4 is a flow chart illustrating an embodiment of a process for providing a security response in the event a configured action is attempted by an executable subsequent to execution of new/changed code comprising the executable.

FIG. 4 is a flow chart illustrating an embodiment of a process for providing a security response in the event a configured action is attempted by an executable subsequent to execution of new/changed code comprising the executable. When/if a configured action (e.g., outbound communication, certain dll or other system resource calls, etc.) is detected (402), it is determined at 404 whether a flag (or other indicator) is set of a value and/or state that indicates a new/changed portion of code has been and/or is executing. If not (404), the action is allowed and the process of FIG. 4 continues. If the flag (or other indicator) is set, at 406 a user is prompted to indicate whether the action should be allowed or blocked. In various embodiments, other and/or different security responses are performed at 406. In the example shown, the process of FIG. 4 continues, and 402-406 are repeated each time the executable requests and/or attempts a configured action, until the executable is no longer executing (408), after which the process of FIG. 4 ends. In some embodiments, an instance of the process of FIG. 4 runs globally for a system or other protected resource, i.e., across zero or more executables. In some embodiments, a separate instance of the process of FIG. 4 runs for each executable and/or new/changed portion thereof.

Using the approach described herein, relatively computationally inexpensive techniques enable a security or other monitoring process to continue to treat unchanged portions of a previously-characterized executable in the same manner as the security process was configured to treat them prior to the original executable being modified and/or replaced by a new (e.g., patched, superseding) version, while still providing an appropriate security response to new/changed portions of the executable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of computer security, comprising:
receiving an indication that a prior version of an executable file has been replaced by a new version, the indication being received from a process executing code other than the executable file;
receiving an identification of a new or changed portion of code comprising the new version, wherein the identification is determined based at least in part upon comparing a flow graph of the new version to a flow graph of the prior version of the executable file; and
providing, using a computer processor, a security response if an indication is received that a process associated with the executable file is attempting to perform a user configurable restricted action and the new or changed portion of code comprising the new version has executed, wherein the user configurable restricted action is one of a set of possible actions that may be attempted by the executable file for which a user has configured the process executing code other than the executable file to trigger the security response when the executable file attempts at least one action from the set of possible actions.

2. The method as recited in claim 1, wherein receiving an indication that the prior version of an executable file has been replaced by the new version includes determining that a current signature associated with the executable file does not match a stored signature associated with the executable file.

3. The method as recited in claim 2, wherein the current signature comprises a current hash based at least in part on a current binary code comprising the executable file.

4. The method as recited in claim 1, wherein providing a security response includes prompting a user to indicate whether the restricted action is allowed.

5. The method as recited in claim 1, further comprising determining that the new or changed portion of code comprising the new version has executed.

6. The method as recited in claim 1, further comprising configuring a mechanism to provide an indication that the new or changed portion of code comprising the new version has executed.

7. The method as recited in claim 6, wherein said mechanism includes a notification function configured to respond to an instruction to execute the new or changed portion by providing said indication that the new or changed portion of code comprising the new version has executed.

8. The method as recited in claim 7, wherein configuring said mechanism further includes configuring said new or changed portion of code to activate said notification function.

9. The method as recited in claim 7, wherein said notification function comprises a trampoline function configured to return control to the new or changed portion of code.

10. The method as recited in claim 7, wherein said notification function is configured to set a flag or other indicator to a state indicating the new or changed portion of code comprising the new version has executed.

11. The method as recited in claim 10, wherein the flag or other indicator is stored in a reserved memory location.

12. The method as recited in claim 11, wherein the flag or other indicator is stored in a location associated with the new or changed portion of code.

13. The method as recited in claim 1, further comprising not providing the security response if an indication is received that a process associated with the executable file is attempting to perform a restricted action and it is determined that a new or changed portion of code comprising the new version has not executed.

14. The method as recited in claim 1, further comprising providing the security response with respect to the entire executable file if it is determined that the new version satisfies a difference criteria with respect to the prior version.

15. The method as recited in claim 1, wherein the restricted action comprises one or more of the following: an outbound network communication, a system call, a dll call, and an attempt to access a computer resource.

16. A system for providing computer security, comprising:
a processor configured to:
receive an indication that a prior version of an executable file has been replaced by a new version, the indication being received from a process executing code other than the executable file;
receive an identification of a new or changed portion of code comprising the new version, wherein the identification is determined based at least in part upon comparing a flow graph of the new version to a flow graph of the prior version of the executable file; and
provide a security response if an indication is received that a process associated with the executable file is attempting to perform a user configurable restricted action and the new or changed portion of code comprising the new version has executed, wherein the user configurable restricted action is one of a set of possible actions that may be attempted by the executable file for which a user has configured the process executing code other than the executable file to trigger the security response when the executable file attempts at least one action from the set of possible actions; and
a memory coupled to the processor and configured to store an indication that the new or changed portion of code comprising the new version has executed.

17. The system as recited in claim 16, wherein the processor is further configured to detect that the new or changed portion of code comprising the new version has executed and store in a reserved location in said memory a data value indicating that the new or changed portion of code comprising the new version has executed.

18. The system as recited in claim 17, wherein the processor is further configured to respond to the indication that the process associated with the executable file is attempting to perform the restricted action by checking said reserved location to determine if the data value indicating that the new or changed portion of code comprising the new version has executed is stored in the reserved location.

19. A non-transitory computer readable storage medium for providing computer security comprising computer instructions for:
receiving an indication that a prior version of an executable file has been replaced by a new version, the indication being received from a process executing code other than the executable file;
receiving an identification of a new or changed portion of code comprising the new version, wherein the identification is determined based at least in part upon comparing a flow graph of the new version to a flow graph of the prior version of the executable file; and
providing a security response if an indication is received that a process associated with the executable file is attempting to perform a user configurable restricted action and the new or changed portion of code comprising the new version has executed, wherein the user configurable restricted action is one of a set of possible actions that may be attempted by the executable file for which a user has configured the process executing code other than the executable file to trigger the security response when the executable file attempts at least one action from the set of possible actions.

20. The non-transitory computer readable storage medium as recited in claim 19, further comprising computer instructions for generating a functional flow graph of the new version and identifying, based at least in part on the functional flow graph, the new or changed portion of code.

* * * * *